United States Patent
Suzuki et al.

(10) Patent No.: US 8,089,662 B2
(45) Date of Patent: *Jan. 3, 2012

(54) IMAGE FORMING APPARATUS

(75) Inventors: Masashi Suzuki, Nagoya (JP); Hiroshi Koie, Nagoya (JP); Hideo Ueno, Nagoya (JP); Kazunari Taki, Nagoya (JP); Takahiro Ikeno, Seto (JP); Takahiro Hosokawa, Nagoya (JP)

(73) Assignee: Brother Kyogo Kabushiki Kaisha, Nagoya-shi. Aichi-ken (JP)

( * ) Notice: Subject to any disclaimer, the term of this patent is extended or adjusted under 35 U.S.C. 154(b) by 1032 days.

This patent is subject to a terminal disclaimer.

(21) Appl. No.: 11/860,067

(22) Filed: Sep. 24, 2007

(65) Prior Publication Data

US 2008/0074710 A1 Mar. 27, 2008

(30) Foreign Application Priority Data

Sep. 25, 2006 (JP) .................................. 2006-259117

(51) Int. Cl.
*H04N 1/40* (2006.01)
(52) U.S. Cl. ..... 358/443; 358/1.11; 358/1.15; 358/1.16; 399/24; 399/389; 400/88; 400/79; 709/206; 709/201
(58) Field of Classification Search .................. 358/443, 358/1.1, 1.16, 1.15, 1.18; 399/24; 709/206, 709/201, 228, 224; 400/88, 76
See application file for complete search history.

(56) References Cited

U.S. PATENT DOCUMENTS

| | | | |
|---|---|---|---|
| 5,983,241 A | 11/1999 | Hoshino | |
| 6,409,401 B1 * | 6/2002 | Petteruti et al. | ................. 400/88 |
| 6,477,528 B1 | 11/2002 | Takayama | |
| 6,585,154 B1 | 7/2003 | Ostrover et al. | |
| 6,691,918 B1 | 2/2004 | Yoda et al. | |
| 6,827,279 B2 | 12/2004 | Teraura | |
| 6,846,056 B2 | 1/2005 | Jacobsen et al. | |
| 7,003,256 B2 | 2/2006 | Kumakura et al. | |
| 7,061,634 B1 * | 6/2006 | Ogura et al. | ................. 358/1.15 |
| 7,405,841 B2 * | 7/2008 | Takenouchi | ................. 358/1.18 |

(Continued)

FOREIGN PATENT DOCUMENTS

CN 1319821 A 10/2001

(Continued)

OTHER PUBLICATIONS

CN Office Action dtd May 8, 2009, CN Appln. 200710154195.5, partial English translation.

(Continued)

*Primary Examiner* — Negussie Worku
(74) *Attorney, Agent, or Firm* — Banner & Witcoff, Ltd

(57) ABSTRACT

An image forming apparatus includes an interface unit which receives print data and file data; a printing unit which prints an image on a recording medium; a writing unit which stores tag data in a non-contact type tag when the recording medium provides the non-contact type tag; a buffer unit in which file data is stored in the non-contact type tag; and a control unit which controls the printing unit and the writing unit. The control unit stores the file data in the buffer unit when the file data is received. The control unit controls the printing unit to form an image on the recording medium based upon content of the print data when the print data is received. The control unit controls the writing unit to store the file data stored in the buffer unit in the non-contact type tag.

9 Claims, 6 Drawing Sheets

U.S. PATENT DOCUMENTS

| | | | |
|---|---|---|---|
| 7,428,067 B2 | 9/2008 | Kiwada | |
| 7,443,420 B2 * | 10/2008 | Maeda | 348/207.2 |
| 7,450,253 B2 | 11/2008 | Kiwada | |
| 7,466,957 B2 * | 12/2008 | Muto | 399/389 |
| 7,728,992 B2 | 6/2010 | Yamamoto et al. | |
| 7,731,435 B2 | 6/2010 | Piersol et al. | |
| 2002/0049702 A1 | 4/2002 | Aizikowitz et al. | |
| 2003/0053118 A1 | 3/2003 | Muramoto et al. | |
| 2003/0088557 A1 | 5/2003 | Morino | |
| 2003/0223638 A1 | 12/2003 | Jackson et al. | |
| 2004/0096123 A1 | 5/2004 | Shih et al. | |
| 2004/0100381 A1 | 5/2004 | Waters | |
| 2004/0141200 A1 | 7/2004 | Minami et al. | |
| 2004/0184097 A1 | 9/2004 | Suzuki | |
| 2005/0003839 A1 | 1/2005 | Tripp | |
| 2005/0024393 A1 | 2/2005 | Kondo et al. | |
| 2005/0029353 A1 | 2/2005 | Isemura et al. | |
| 2005/0105724 A1 | 5/2005 | Hull et al. | |
| 2005/0125093 A1 * | 6/2005 | Kikuchi et al. | 700/213 |
| 2005/0141003 A1 | 6/2005 | Yamamoto et al. | |
| 2005/0141004 A1 | 6/2005 | Kiwada | |
| 2005/0162699 A1 | 7/2005 | Fukunaga et al. | |
| 2005/0171739 A1 | 8/2005 | Squibbs et al. | |
| 2005/0172215 A1 | 8/2005 | Squibbs et al. | |
| 2005/0175259 A1 | 8/2005 | Takenouchi | |
| 2005/0200910 A1 | 9/2005 | Kanoshima et al. | |
| 2006/0017950 A1 | 1/2006 | Ikegami et al. | |
| 2006/0047999 A1 | 3/2006 | Passerini et al. | |
| 2006/0051056 A1 | 3/2006 | Furukawa | |
| 2006/0061814 A1 | 3/2006 | Tokunaga | |
| 2006/0076399 A1 | 4/2006 | Imine et al. | |
| 2006/0098236 A1 | 5/2006 | Yamashita et al. | |
| 2006/0132816 A1 | 6/2006 | Yamamoto et al. | |
| 2006/0164696 A1 | 7/2006 | Kurohata et al. | |
| 2006/0176511 A1 | 8/2006 | Tagawa | |
| 2006/0248454 A1 | 11/2006 | Giannetti | |
| 2007/0024901 A1 | 2/2007 | Kayama | |
| 2007/0036599 A1 | 2/2007 | Piersol et al. | |
| 2007/0146878 A1 * | 6/2007 | Liao | 359/460 |
| 2007/0152058 A1 | 7/2007 | Yeakley et al. | |
| 2007/0273525 A1 | 11/2007 | Garber et al. | |
| 2008/0079994 A1 * | 4/2008 | Ueno et al. | 358/1.15 |
| 2008/0098303 A1 | 4/2008 | Murayama | |
| 2008/0151299 A1 * | 6/2008 | Takahata | 358/1.15 |
| 2008/0180710 A1 * | 7/2008 | Muto | 358/1.9 |
| 2008/0232882 A1 * | 9/2008 | Koie et al. | 400/76 |
| 2008/0247794 A1 * | 10/2008 | Muto | 399/389 |
| 2008/0317479 A1 * | 12/2008 | Kadowaki | 399/12 |

FOREIGN PATENT DOCUMENTS

| | | |
|---|---|---|
| EP | 0 944 238 A1 | 9/1999 |
| JP | 62-171049 A | 7/1987 |
| JP | 62-197840 A | 9/1987 |
| JP | 63-065544 A | 3/1988 |
| JP | 2-260045 A | 10/1990 |
| JP | 3-4937 B2 | 1/1991 |
| JP | 3-102438 A | 4/1991 |
| JP | 5-113920 A | 5/1993 |
| JP | 7-334397 A | 12/1995 |
| JP | 8-202603 A | 8/1996 |
| JP | 9-034763 A | 2/1997 |
| JP | 2624170 B2 | 4/1997 |
| JP | 10-294818 A | 11/1998 |
| JP | 2000-020664 | 1/2000 |
| JP | 3036977 B2 | 4/2000 |
| JP | 2000-285203 | 10/2000 |
| JP | 2001-043231 A | 2/2001 |
| JP | 2001-134723 | 5/2001 |
| JP | 2001-180021 A | 7/2001 |
| JP | 2002-149701 A | 5/2002 |
| JP | 2002-337426 | 11/2002 |
| JP | 2003-242158 A | 8/2003 |
| JP | 2003-263084 A | 9/2003 |
| JP | 2003-320735 | 11/2003 |
| JP | 2003-330769 A | 11/2003 |
| JP | 2003-346086 A | 12/2003 |
| JP | 2004-066692 | 3/2004 |
| JP | 2004-094731 A | 3/2004 |
| JP | 2004-094953 | 3/2004 |
| JP | 2004-157588 | 6/2004 |
| JP | 2004-181953 A | 7/2004 |
| JP | 2004-222085 | 8/2004 |
| JP | 2004-249499 | 9/2004 |
| JP | 2004-265586 A | 9/2004 |
| JP | 2004-287556 | 10/2004 |
| JP | 2004-310293 | 11/2004 |
| JP | 2004-310293 A | 11/2004 |
| JP | 2004-314590 A | 11/2004 |
| JP | 2004-322570 | 11/2004 |
| JP | 2005-022847 | 1/2005 |
| JP | 2005-028673 A | 2/2005 |
| JP | 2005-059577 | 3/2005 |
| JP | 2005-101935 | 4/2005 |
| JP | 2005-109681 | 4/2005 |
| JP | 2005-117571 | 4/2005 |
| JP | 2005-148240 | 6/2005 |
| JP | 2005-149291 A | 6/2005 |
| JP | 2005-151244 A | 6/2005 |
| JP | 2005-165410 A | 6/2005 |
| JP | 2005-174530 | 6/2005 |
| JP | 2005-192080 | 7/2005 |
| JP | 2005-196263 | 7/2005 |
| JP | 2005-196840 A | 7/2005 |
| JP | 2005-197831 | 7/2005 |
| JP | 2005-197834 | 7/2005 |
| JP | 2005-197835 | 7/2005 |
| JP | 2005-202714 A | 7/2005 |
| JP | 2005-212303 | 8/2005 |
| JP | 2005-225100 | 8/2005 |
| JP | 2005-229266 | 8/2005 |
| JP | 2005-236740 A | 9/2005 |
| JP | 2005-242763 | 9/2005 |
| JP | 2005-246680 A | 9/2005 |
| JP | 2005-280046 | 10/2005 |
| JP | 2005-285094 | 10/2005 |
| JP | 2005-303422 A | 10/2005 |
| JP | 2005-305662 | 11/2005 |
| JP | 2005-313551 | 11/2005 |
| JP | 2005-327248 | 11/2005 |
| JP | 2005-332042 A | 12/2005 |
| JP | 2006-007674 | 1/2006 |
| JP | 2006-011977 | 1/2006 |
| JP | 2006-027678 | 2/2006 |
| JP | 2006-053671 A | 2/2006 |
| JP | 2006-054777 A | 2/2006 |
| JP | 2006-065912 A | 3/2006 |
| JP | 2006-082490 A | 3/2006 |
| JP | 2006-82940 A | 3/2006 |
| JP | 2006-094037 A | 4/2006 |
| JP | 2006-103284 A | 4/2006 |
| JP | 2006-157439 A | 6/2006 |
| JP | 2006-175647 A | 7/2006 |
| JP | 2006-175813 A | 7/2006 |
| JP | 2006-181807 A | 7/2006 |
| JP | 2006-197324 A | 7/2006 |
| JP | 2006-218773 A | 8/2006 |
| JP | 2006-229670 A | 8/2006 |
| JP | 2006-252045 A | 9/2006 |
| JP | 2008-511084 T | 4/2008 |
| JP | 2001-077959 A | 10/2009 |
| WO | 2006-023992 A2 | 3/2006 |
| WO | 2006/023992 A2 | 3/2006 |
| WO | 2006-064781 A1 | 6/2006 |

OTHER PUBLICATIONS

CN Office Action dtd May 22, 2009, CN Appln. 2007101525327, English translation.
Extended EP Search Report dtd Jul. 2, 2009, EP Appln. 07253683.2.
JP Office Action dtd Jul. 14, 2009, JP Appln. 2006-265321, partial English Translation.
JP Office Action dtd May 20, 2008, JP Appln. 2006-265320.
JP Office Action dtd May 27, 2008, JP Appln. 2006-259138 (no English translation provided).
EP Search Report dtd Mar. 10, 2008, EP App 07253797-0.
JP Office Action dtd Jan. 20, 2009, JP Appln. 2006-259138.

JP Office Action dtd Oct. 28, 2008, JP Appln. 2006-265321 (partial translation provided).
JP Office Action dtd Oct. 21, 2008, JP Appln. 2006-262750.
JP Office Action dtd Oct. 14, 2008, JP Appln. 2006-252991.
JP Office Action dtd Oct. 14, 2008, JP Appln. 2006-252990 (partial translation provided).
JP Office Action dtd Oct. 21, 2008, JP Appln. 2006-265322 (partial translation provided).
JP Office Action dtd Aug. 26, 2008, JP Appln. 2006-259117.
JP Office Action dtd Aug. 5, 2008, JP Appln. 2006-257295.
Copending U.S. Appl. No. 11/859,011, filed Sep. 21, 2007.
Technical Soft Inc,: http://www.softnet.com.jp/kaiteki/index.html; May 23, 2007.
Kinokuniya BookWeb; May 23, 2007.
Co-Pending U.S. Appl. No. 11/853,386, filed Sep. 11, 2007.
Co-Pending U.S. Appl. No. 11/860,259, filed Sep. 24, 2007.
Co-Pending U.S. Appl. No. 11/858,456, filed Sep. 20, 2007.
Co-Pending U.S. Appl. No. 11/857,803, filed Sep. 19, 2007.
Co-Pending U.S. Appl. No. 11/861,617, filed Sep. 26, 2007.
Co-Pending U.S. Appl. No. 11/859,481, filed Sep. 21, 2007.
Co-Pending U.S. Appl. No. 11/860,163, filed Sep. 27, 2007.
Co-Pending U.S. Appl. No. 11/862,246, filed Sep. 27, 2007.
Non-Final Office Action dated Jun. 28, 2011 in U.S. Appl. No. 11/860,163.
Non-Final Office Action dated Jun. 22, 2011 in U.S. Appl. No. 11/859,011.
Notice of Allowance dated Jul. 8, 2011 in U.S. Appl. No. 11/853,386.
Non-Final Office Action dated Mar. 7, 2011 in U.S. Appl. No. 11/857,803.
Non-Final Office Action dated Mar. 2, 2011 in U.S. Appl. No. 11/858,456.
Non-Final Office Action dated Feb. 18, 2011 in U.S. Appl. No. 11/862,246.
Japanese Office Action dated Aug. 5, 2008 in JP 2006-257295.
Non-Final Office Action dated Mar. 21, 2011 in U.S. Appl. No. 11/861,617.
Non-Final Office Action dated Mar. 22, 2011 in U.S. Appl. No. 11/859,481.
Final Office Action dated Aug. 3, 2011 in U.S. Appl. No. 11/862,246.
Final Office Action dated Aug. 12, 2011 in U.S. Appl. No. 11/857,803.
Final Office Action dated Aug. 17, 2011 in U.S. Appl. No. 11/858,456.
Final Office Action dated Aug. 30, 2011 in U.S. Appl. No. 11/859,481.
Notification of Reasons for Refusal dispatched Aug. 17, 2010 in Japanese Application No. 2008-188246 and English Translation thereof.
Final Office Action dated Sep. 2, 2011 in U.S. Appl. No. 11/861,617.

* cited by examiner

IMAGE FORMING APPARATUS

CROSS REFERENCE TO RELATED APPLICATION

The present application claims priority from Japanese Patent Application No. 2006-259117, which was filed on Sep. 25, 2006, the disclosure of which is herein incorporated by reference in its entirety.

TECHNICAL FIELD

The present invention relates to an image forming apparatus for printing an image on a sheet that has a non-contact type tag for transmitting/receiving tag data via a wireless communication, and the image forming apparatus stores the tag data in the non-contact type tag of the sheet.

BACKGROUND

Conventionally, image forming apparatuses are known in the technical field, these image forming apparatuses print images on sheets that have non-contact type tags for transmitting/receiving tag data via wireless communications, and also store the tag data in the non-contact type tags. For instance, a patent publication 1 discloses an image forming apparatus that prints on a sheet having a non-contact type tag in which ID information is stored. A host computer stores the management information after correlating the management information with the ID information stored in the non-contact type tag. For example, the management information is the data name, the IP address and the PC name of the print request source, the paper size, the output sheet quantity, and the management number. When the image forming apparatus prints on a plurality of sheets, the host computer stores each ID information of respective non-contact tags of a plurality of sheets after correlating each ID information with one management information. The image forming apparatus can obtain the management information of the sheet from the host computer by reading out the ID information of the non-contact type tag of the sheet, so that the image forming apparatus can obtain the information as to the print request source of the sheet.

A patent publication 2 discloses an image processing apparatus that carries out the following image processing operations. In the image processing operations, the image processing apparatus stores both a document file of a Japanese sentence and another document file of a translation sentence written in English, German, French languages, and the like in the non-contact type tag of the 1 sheet, when the image processing apparatus prints a document written in Japanese on the sheet; and when the sheet printed based upon the English document is required and the image processing apparatus reads out the English document from the non-contact type tag, the image processing apparatus prints the document written in the English language on such a paper in which the non-contact type tag is not provided.

A patent document 3 discloses an image forming apparatus that prints image data of a concert ticket on a sheet and also stores such information as a name, a sex, and a birth date in correspondence with a content of the image data to be printed in the non-contact type tag of the sheet.

[Patent Publication 1] JP-A-2005-192080
[Patent Publication 2] JP-A-2004-157588
[Patent Publication 3] JP-A-2005-212303

SUMMARY

The conventional image forming apparatus disclosed in the patent document 1 can access the host computer based upon ID information stored in the non-contact type tags of the remaining papers so as to acquire the data name indicative of the printed contents, even when a portion of papers is lost. And the conventional image forming apparatus can reproduce the lost paper based upon the acquired data name. However, the conventional image forming apparatus has a problem. When the conventional image forming apparatus is not installed under network environment, the conventional image forming apparatus cannot access the host computer, so that the lost paper cannot be reproduced.

In the conventional apparatus disclosed in the patent publication 2 and the patent publication 3, since only 1 sheet is provided a non-contact type tag, the conventional apparatus cannot reproduce printing contents of the lost paper, when the paper equipped with the non-tact type tag is lost.

A purpose of the present invention is to provide an image forming apparatus that can reproduce the lost sheet, even when any of sheets that have been printed over plural pages is lost.

According to an aspect of the invention, there is provided an image forming apparatus comprising: an interface unit which receive a print data and file data; a printing unit which prints an image on a recording medium; a writing unit which stores tag data in a non-contact type tag when the recording medium provides the non-contact type tag; a buffer unit in which a file data is stored, the file data is to be stored in the non-contact type tag; and a control unit which controls the printing unit and the writing unit; wherein the control unit stores the file data in the buffer unit when the file data is received, the control unit controls the printing unit to form an image on the recording medium based upon a content of the print data when the print data is received, the control unit controls the writing unit to store the file data stored in the buffer unit in the non-contact type tag.

BRIEF DESCRIPTION OF THE DRAWINGS

Illustrative aspects of the invention will be described in detail with reference to the following figures wherein.

DETAILED DESCRIPTION OF THE PREFERRED EMBODIMENTS

Referring to drawings, a detailed description is following for explaining how to carry out best modes of the present invention.

First Embodiment

Figure 1:
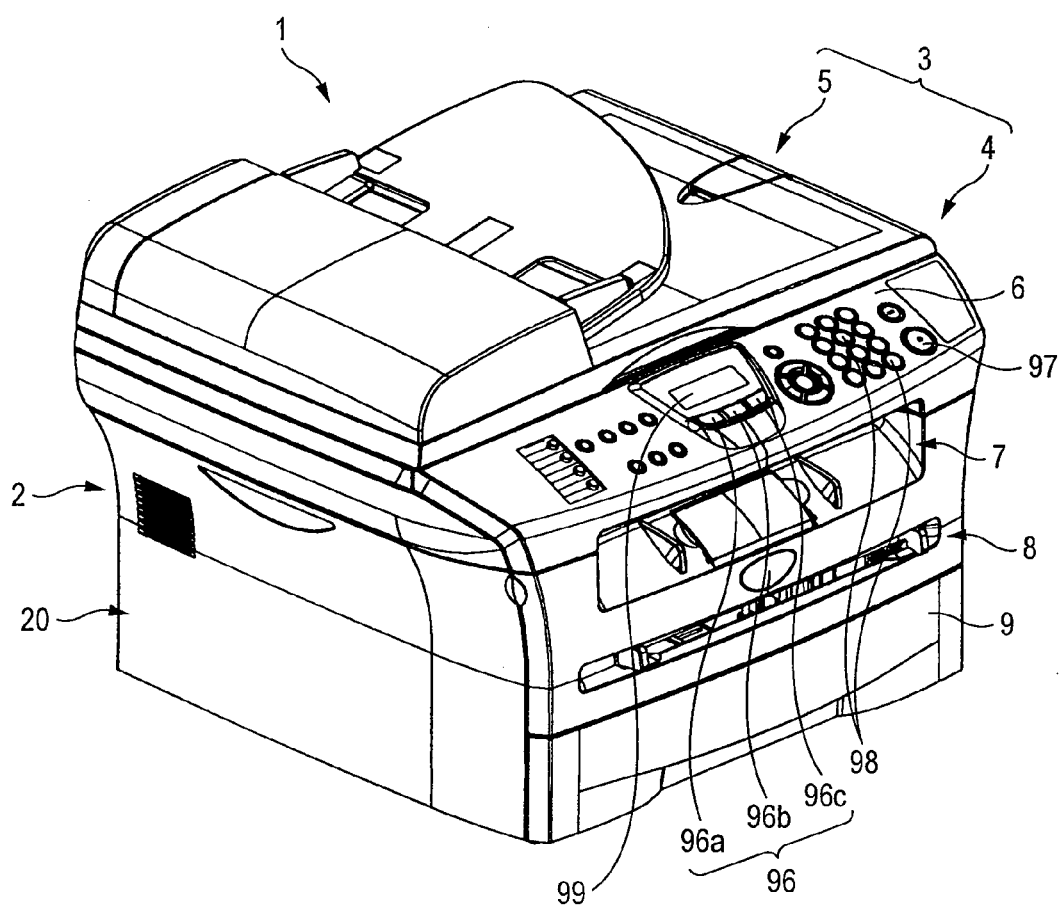
FIG. 1 is a perspective view for showing an outer appearance of a multi-function device in accordance with an exemplary embodiment of the present invention.
Figure 2:
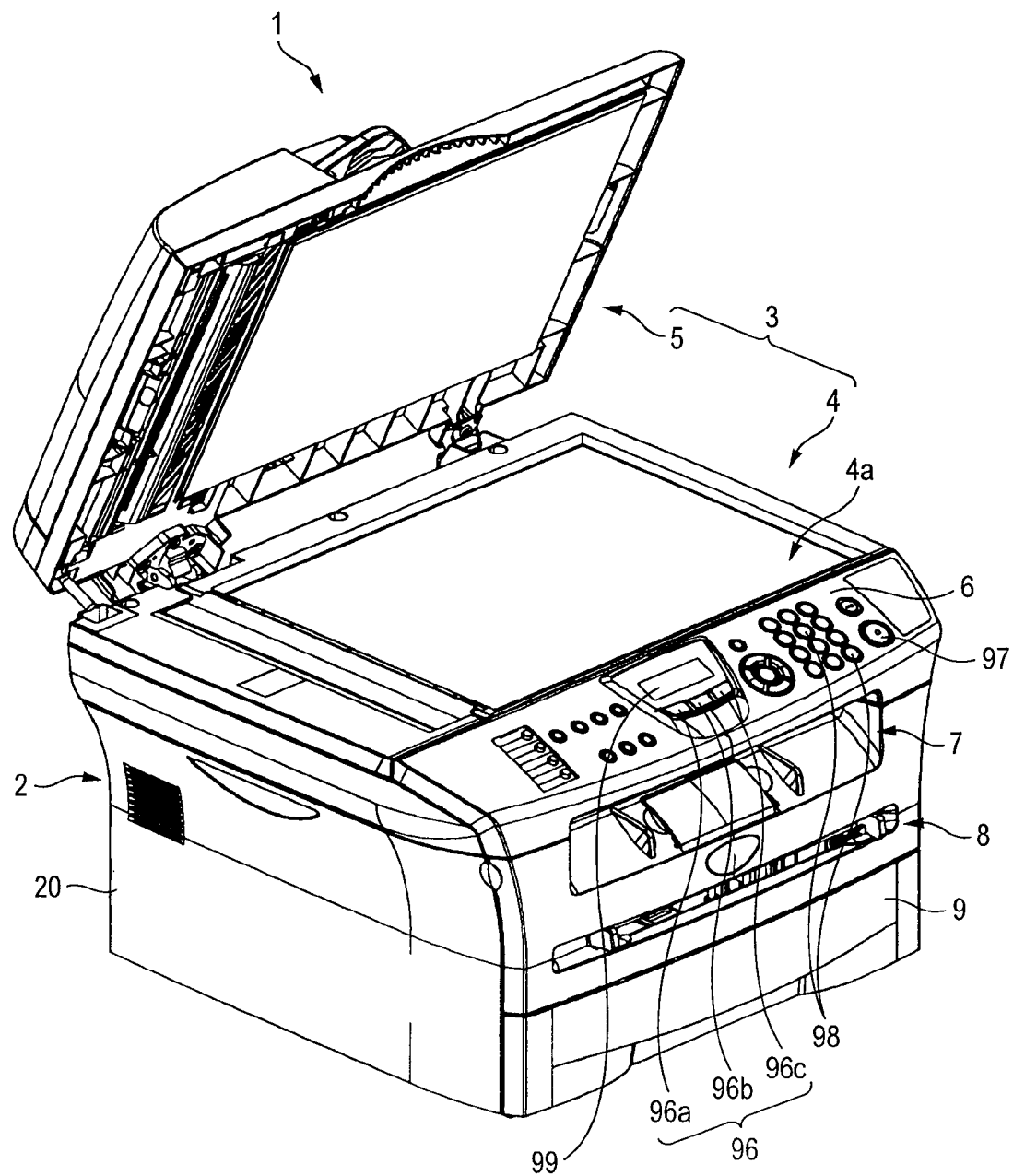
FIG. 2 is a perspective view for showing the multi-function device in which a reading unit is opened in accordance with an exemplary embodiment of the present invention.

A multi-function device 1 in accordance with a first embodiment is an apparatus for printing an image, which includes a printer function, a scanner function, a copy function. FIG. 1 is a perspective view for showing an outer appearance of the multi-function device 1. Also, FIG. 2 is a perspective view of the multi-function device 1 which shows such a condition that a reading unit 3 is opened. In the following description with respect to the multi-function device 1, a side plane (namely, lower right direction as viewed in FIG. 1) where an operation unit 6 has been provided is defined as a "front direction" and an opposite side plane (namely, upper left direction as viewed in FIG. 1) is defined as a "rear direction".

The multi-function device 1 includes an image forming unit 2, and an automatic fed original reading unit 3 (will be referred to as "reading unit 3" hereinafter). The image forming unit 2 includes a feeder unit 21, an image forming section 22 (refer to FIG. 3). As shown in FIG. 1 and FIG. 2, the reading unit 3 includes an image reading device 4, and an automatic original feeding device 5 (will be referred to as "ADF 5" hereinafter). An original base 4a having a rectangular shape is mounted on an upper plane of the image reading device 4. The ADF 5 is arranged in such a manner that the ADF 5 covers the original base 4a. As shown in FIG. 2, a rear edge portion of the reading unit 3, which is located opposite to the operation unit 6, is rotatably supported on the upper rear edge side of the image forming unit 2.

The operation unit 6 in which a user can operate various sorts is provided on one edge side (lower right direction as viewed in FIG. 1) of the image reading device 4. The operation unit 6 includes a mode selection switch 96, a start key 97, various sorts of operation buttons 98, and a touch panel 99 made of a liquid crystal display.

The mode selecting switch 96 can select any one of three sorts of function modes (modes capable of operating FAX function, scanner function, and copy function). Concretely speaking, three mode keys are arrayed in the mode selecting switch 96 along right and left directions. The three mode keys are a copy mode key 96a for selecting a copy mode; a FAX mode key 96b for selecting a FAX (facsimile) mode; and a scanner mode key 96c for selecting a scanner.

The start key 97 is a switch for starting an operation corresponding to a function mode. When the start key 97 is depressed (turned ON) in the copy mode, a multi-function device 1 starts a copying operation for an original mounted on the original base 4a. When the start key 97 is depressed in the FAX mode, a multi-function device 1 carries out a FAX transmission/original reading operation. When the start key 97 is depressed in the scanner mode, a multi-function device 1 carries out a scanner original reading operation.

The touch panel 99 displays a setting menu bottom (not shown) by a predetermined operation. When the setting menu button is touched, the touch panel 99 displays indications related to setting menu of various sorts. Also, a display portion, which is a part of the touch panel 99, displays an error indication, when an error occurs, e.g., a depletion of a sheet W after a print request is issued. The error indication notifies that the error occurs to a user.

A sheet deriving hole 7 is formed at a lower side position of the operation unit 6. The sheet deriving hole 7 is opened and connected to a sheet discharging tray 2a (see FIG. 3, will be explained later). A hand feed-in port 8 is formed in a lower side of the paper deriving hole 7. The hand feed-in port 8 is opened in a slit shape and extended along the horizontal direction. And a sheet feeding cassette 9 is provided on a further lower position of this lower side.

Figure 3:
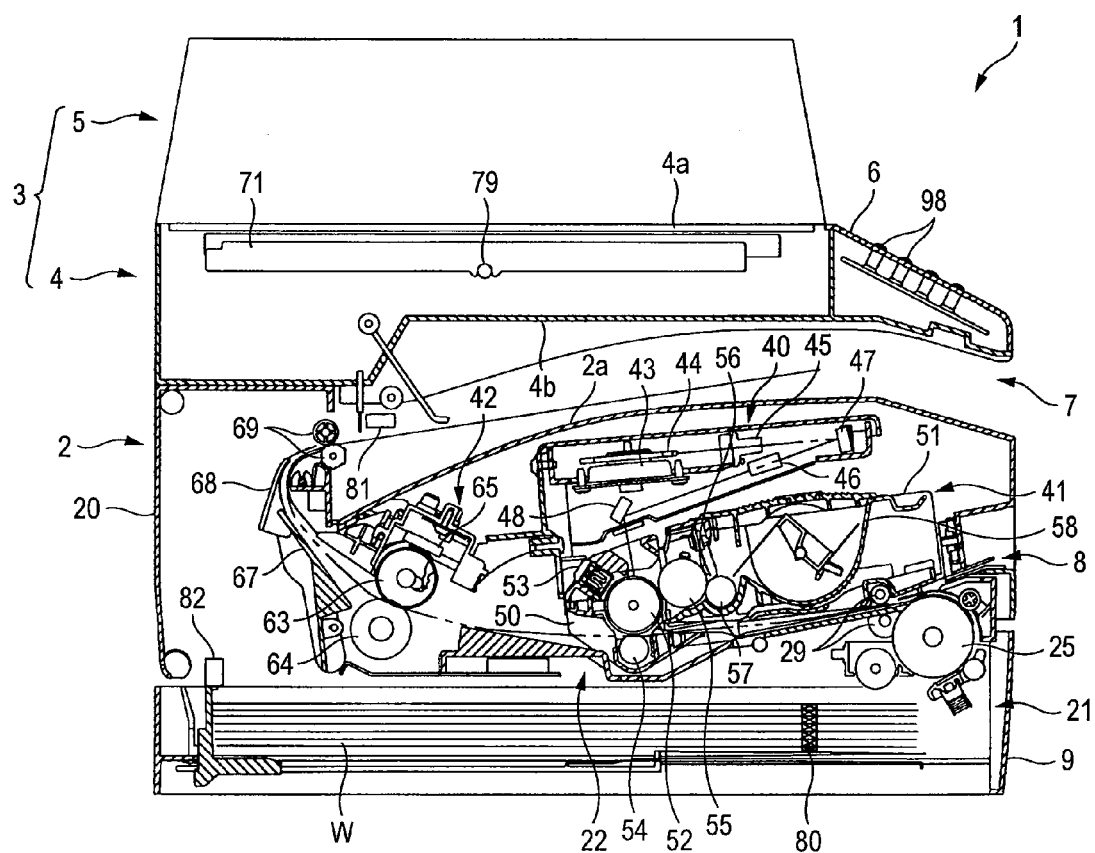
FIG. 3 is a side sectional view of a major portion of the multi-function device when the multi-function device is viewed from a shaft direction of a sheet feeding roller in accordance with an exemplary embodiment of the present invention.

Referring to FIG. 3, a description for explaining the image forming unit 2 is following. FIG. 3 is a side sectional view of a major portion of the multi-function device 1, as viewed from a shaft direction of a feed roller 25. In this drawing, a right side as viewed on this drawing corresponds to the front direction of the multi-function device 1, whereas a left side as viewed on this drawing corresponds to the rear direction of the multi-function device 1.

A feeder unit 21 for feeding a sheet W and an image forming section 22 are located in a casing 20 of the image forming unit 2. The image forming section forms a predetermined image on the fed sheet W. Also, a sheet discharging tray 2a is arranged on an upper portion of the image forming section 22. The sheet discharging tray 2a holds a sheet W on which an image has been formed by the image forming section 22 and then has been discharged.

The feeder unit 21 includes a sheet feeding cassette 9, a sheet depressing plate (not shown) provided in a swingable manner within the sheet feeding cassette 9, a feed roller 25 provided above a front edge-sided edge portion of the sheet feeding cassette 9.

The sheet feeding cassette 9 is arranged on the lower side within the casing 20. The sheet feeding cassette 9 is installed in a detachable manner (can be installed/removed) from a plane on the side of the operation unit 6. A plurality of sheets is stacked and stored in the sheet feeding cassette 9. Thus, a sheet W located at the uppermost position of the sheet feeding cassette 9 is sequentially fed to the side of a register roller 29 via a convey path by the sheet feeding roller 25.

In the first embodiment, a sheet W equipped with a non-contact type tag 80 (Radio Frequency Identification "RFID" tag) is stored in the sheet feeding cassette 9. The non-contact type tag 80 stores information inside itself, and further, transmits and/or receives electromagnetic waves with an antenna (not shown).

The sheet W has the non-contact type tag 80 in a portion of an edge portion of a rectangular-shaped sheet W. As this edge portion of the sheet W, a margin portion near the upper right edge of the sheet W is used which becomes a blank during a printing operation, or alternatively, corner portions (4 corners) of the sheet W may be used. Similar to a normal sheet, the sheet plane of the sheet W can be printed.

A installing/removing sensing unit 82 for sensing installing/removing of the sheet feeding cassette 9 is provided on the side of the rear edge of the sheet feeding cassette 9, when the sheet feeding cassette 9 is installed in the casing 20. The installing/removing unit 82 corresponds to, for example, a photoelectric sensor in which one pair of a light projecting element (not shown) and a light receiving element (not shown) are provided on both sides of the sheet feeding cassette 9. The light receiving element receives light projected from the light projecting element. When the sheet feeding cassette 9 is installed in the casing 20, the light projected from the light projecting element is shielded by the side wall of this sheet feeding cassette 9. When the sheet feeding cassette 9 is removed from the casing 20, the light projected from the light projecting element is received by the light receiving element. Then, a signal which change in response to amounts of light received by the light receiving element is outputted to a CPU 90, so that the CPU 90 can detect that the sheet feeding cassette 9 is installed in the casing 20, and also, is removed from the casing 20.

The registration roller 29 is a pair of rollers. The driving operation and the stopping operation of this registration roller 29 are controlled by a control circuit 83 based upon sensing timing by a position sensor (not shown) which is arranged near the sheet feeding roller 25. Then, the registration roller 29 corrects oblique travels of the sheet W with this control operation.

The image forming section 22 includes a scanner unit 40, a process unit 41, and a fixing unit 42. As shown in FIG. 3, the scanner unit 40 is provided at an upper portion within the casing 20. The scanner unit 40 includes a laser emitting unit (not shown), a polygon mirror 44 which is rotatably driven by a polygon motor 43, lenses 45 and 46, and reflection mirrors 47 and 48. A laser beam which is emitted from the laser emitting unit based upon predetermined print data passes through, or is reflected through, the polygon mirror 44, the lens 45, the reflection mirror 47, the lens 46, and the reflection mirror 48 in a sequential manner. Therefore the laser beam is illuminated on a surface of a photosensitive drum 52 provided in a process unit 41 (will be discussed later) in a high speed scanning mode.

The multi-function device 1 includes the process unit 41 which can be installed in/removed from the main body of the image forming unit 2. The process unit 41 includes a drum cartridge 50, and a developing cartridge 51.

In the process unit 41, the drum cartridge 50 includes the photosensitive drum 52, a scorotron type charger 53, and a transfer roller 54. Also, the developing cartridge 51 includes a developing roller 55, a layer thickness restricting blade 56 which is contacted onto the developing roller 55 under pressure, a toner supply roller 57, a toner box 58 into which toners (developing agent) are filled.

The photosensitive drum 52 is arranged at a side position of the developing roller 55 in such a manner that the photosensitive drum 52 can be rotated along the clockwise direction under such a condition that this photosensitive drum 52 is located opposite to the developing roller 55. The scorotron type charger 53 is a plus charging-purpose scorotron type charger. The scorotron type charger 53 is arranged to be separated from the photosensitive drum 52 in a predetermined interval in such a manner that this scorotron type charger 53 is not contacted to the photosensitive drum 52.

The surface of the photosensitive drum 52 is uniformly charged in the plus mode by the scorotron type charger 53 in connection with the rotation of the photosensitive drum 52. And then, this charged surface is exposed by the laser beam emitted from the scanner unit 40 in the high speed scanning mode, so that an electrostatic latent image is formed on the surface of the photosensitive drum 52 based upon the predetermined print data.

Toners are carried on the developing roller 55 and are charged in the plus mode according with the rotation of the developing roller 55. And then, the toners are supplied to the electrostatic latent image formed on the surface of the photosensitive drum 52, when the toners are contacted with the photosensitive drum 52 in the opposite manner.

The transfer roller 54 is arranged under the photosensitive drum 52 in such a manner that this transfer roller 52 is located opposite to this photosensitive drum 52. And the transfer roller 54 is rotatably supported on the drum cartridge 50 along the counter clockwise direction. Then, the visible image carried on the surface of the photosensitive drum 52 is transferred to a sheet W while this sheet W passes between the photosensitive drum 52 and the transfer roller 54.

The fixing unit 42 is arranged on the down stream side (rear direction side) of the sheet feeding direction, which is lower than the process unit 41. The fixing unit 42 includes a heating roller 63, a pressing roller 64, and a thermistor 65. The heating roller 63 heats toners transferred onto the sheet W so as to melt the toners. The pressing roller 64 is positioned opposite to the heating roller 63, and pressing the sheet W against the heating roller 63.

The heating roller 63 includes a metal element tube functioning as a cylindrical member. A halogen lamp is installed in the heating roller 63 along an axial direction of this metal element tube. The halogen lamp can heat the surface of the heating roller 63 until the temperature thereof becomes a fixing temperature (for example, 200° C.) at which the toners are fixed on the sheet W.

The pressing roller 64 includes a metal roller shaft, and a rubber roller. The rubber roller covers a circumference of this roller shaft, and is made of a rubber material. The pressing roller 64 is elastically depressed against the metal element tube of the heating roller 63 by the rubber roller of the pressing roller 64. And then, the pressing roller 64 may be driven in accordance with the rotation of the heating roller 63.

The thermistor 65 is an element whose resistance value is changed in response to a temperature. The thermistor 65 measures a temperature of the heating roller 63 based upon the resistance value thereof. The CPU 90 turns ON/OFF a power supply of the halogen lamp which heats the heating roller 63 in response to the measured temperature. In this way, the CPU 90 controls the temperature of the heating roller 63 so as to become a predetermined temperature.

In such a fixing unit 42, the heating roller 63 heats and presses the toners transferred to the sheet W in the process unit 41 while this sheet W passes between the heating roller 63 and the pressing roller 64, so that the toners are fixed on this sheet W.

Furthermore, the heating roller 63 feeds the sheet W on which the image has been fixed to a sheet discharging roller 69 via a sheet discharging path formed by guide members 67 and 68. Then, the sheet discharging roller 69 discharges the fed sheet W on the sheet discharging tray 2a. An IC writer 81 is provided in the vicinity of the sheet discharging roller 69. The IC writer 81 is located opposite to the non-contact type tag 80 of the sheet W fed by the sheet discharging roller 69. The IC writer 81 can store tag data in the non-contact type tag 80 of the sheet W by generating electromagnetic waves from an antenna (not shown).

The reading unit 3 includes the image reading device 4 and the ADF 5. The image reading device 4 is arranged above the sheet discharging tray 2a of the image forming unit 2 in such a manner that a lower plane 4b of the image reading device 4 is located opposite to the sheet discharging tray 2a and cover the sheet discharging tray 2a.

The reading unit 3 is a flat head type scanner. In the flat head type scanner, the original base 4a is exposed (refer to FIG. 2), when the ADF is opened along the rear direction. Originals are read in a copying operation under such a condition that a book and other originals are mounted on the original base 4a.

It should be understood that reading operations of an original are realized in such a case that the original is mounted on the original base 4a, and also, in another case that the ADF 5 is utilized. When the original is mounted on the original base 4a so as to read the original, a CIS (Contact Image Sensor) 71 is transported along a shaft 79 elongated along the convey direction of the original and further along the original base 4a. In this transporting operation, the reading operation of the original mounted on the original base 4a is carried out every 1 line. On the other hand, when the ADF 5 is utilized so as to read the original, the CIS 71 is transported to the left edge side of the original base 4a, and is maintained at this position, so that the reading operation of the original conveyed by the ADF 5 is carried out every 1 line.

Figure 4:
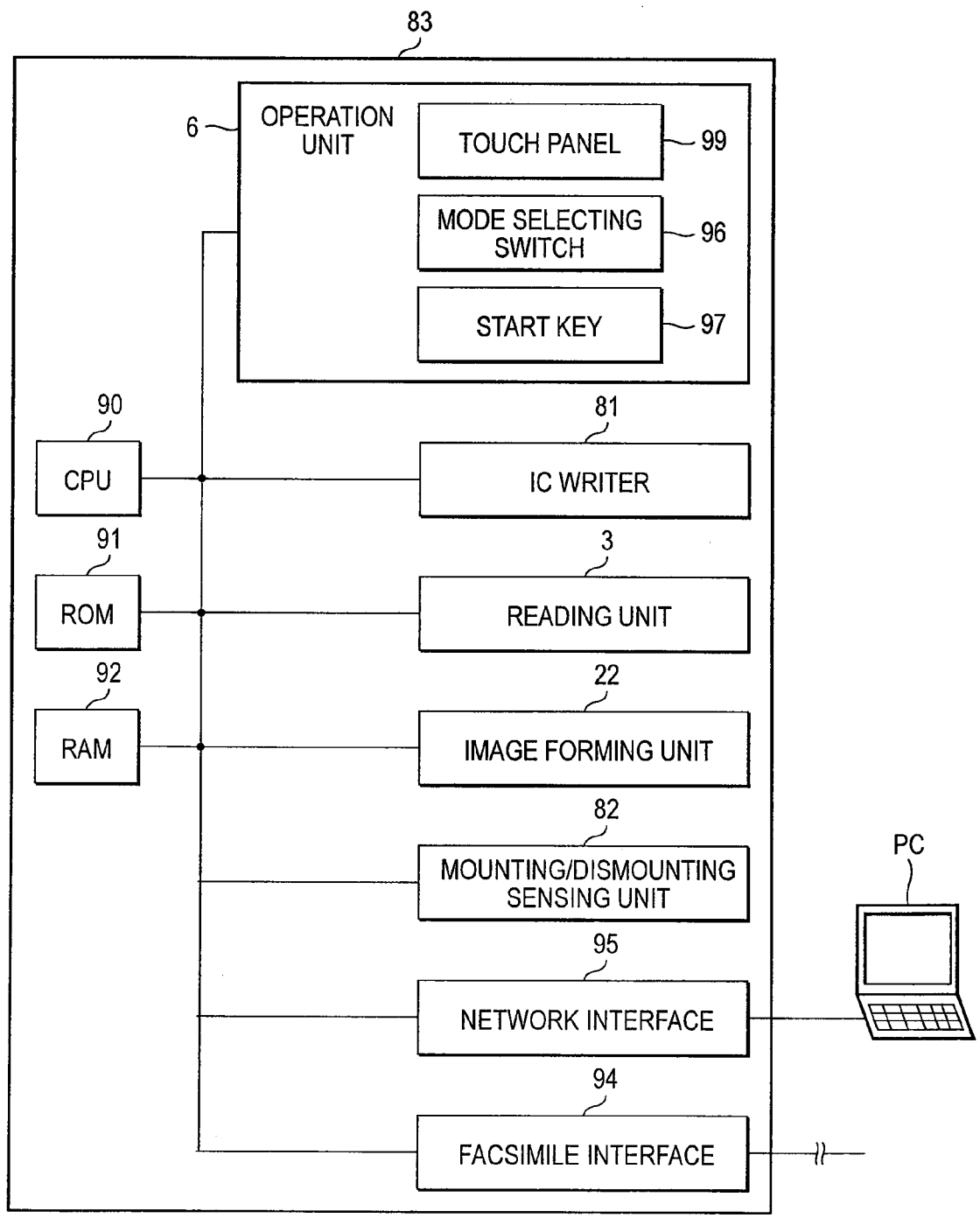
FIG. 4 is a block diagram for showing an electric system employed in the multi-function device in accordance with an exemplary embodiment of the present invention.

FIG. 4 is a block diagram for showing an electric system of the multi-function device 1 in accordance with the first embodiment of the present invention. As shown in FIG. 4, the multi-function device 1 includes an operation unit 6, a installing/removing sensing unit 82, an IC writer 81, a reading unit 3 for reading an image, an image forming section 22, a ROM 91, a RAM 92, a CPU 90, a facsimile interface 94, and a network interface 95. The operation unit 6 receives various sorts of input operations. The installing/removing sensing unit 82 senses that the sheet feeding cassette 9 is installed and/or removed. The IC writer 81 stores tag data in the non-contact type tag 80. The image forming section 22 performs heating/fixing operations with the printing and fixing unit 42. The facsimile interface 94 is connected to a communication line such as a telephone line. The network interface 95 is connected to a personal computer (will be referred to as "personal computer PC" hereinafter).

When the CPU 90 receives print data transmitted from the external personal computer PC and also receives image data sent from the reading unit 3 since a copy scanning operation is carried out, the CPU 90 stores the print data, the image data, and information added to data (for example, information of user who issues print command, and page information such as total number of print request) in the RAM 92.

Figure 5:
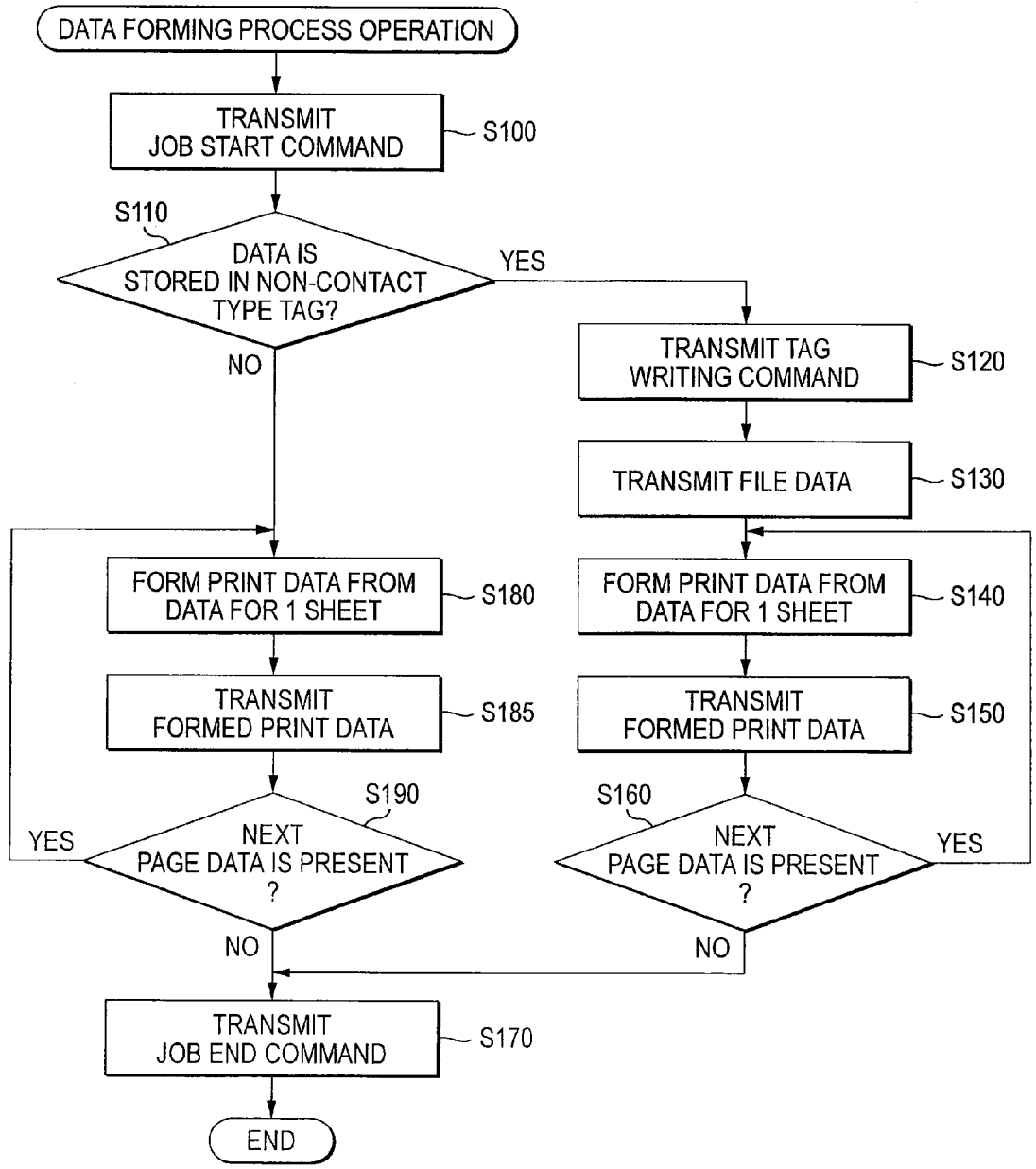
FIG. 5 is a flow chart for showing an example as to a data forming process operation executed in the personal computer in accordance with an exemplary embodiment of the present invention.

Following description is for explaining a data forming process operation that is executed by the personal computer. FIG. 5 is a flow chart for showing one example of the data forming process operation that is carried out by the personal computer PC in accordance with the first embodiment.

As shown in FIG. 5, firstly, the personal computer PC transmits a job starting command for instructing the start of the printing operation to the multi-function device 1 (step 100, will be referred to as "S100" hereinafter). After transmitting the job starting command, the personal computer PC judges whether or not tag data will be stored in the non-contact type tag 80 (S110). The judgment as to whether or not the tag data will be stored in the non-contact tag is made as follows. For instance, the personal computer PC displays a check box for inquiring whether or not the tag data is to be stored on the screen thereof. When the check box is checked, the personal computer PC judges that the tag data is to be stored (YES: S110), and then, transmits a tag writing command to the multi-function device 1 (S120).

After transmitting the tag writing command (S120), the personal computer PC transmits file data that is a print file to the multi-function device 1 to store in the non-contact type tag 80 as a tag data (S130). The print file corresponds to a source file of a sentence edited by executing sentence editing software of the personal computer PC, or a source file of a table formed by executing a spreadsheet program. The print file is a file that will now be printed by the multi-function device 1. The print file requires a plurality of sheets, when the multi-function device 1 prints the content of the print file on sheets. And the print file is set in such a manner that printing operations are continuously carried out over a plurality of pages by the sentence editing software and the like.

It should be understood that in accordance with the embodiment of the present invention, the personal computer PC transmits directly not only a print file, but also a print file that is converted into a file having another format. And then, the personal computer PC transmits a converted file that is made of the print file to the multi-function device 1 as file data. For instance, a print file may be converted into such a file having a PDF (Portable Document Format) format; the personal computer PC may transmit the file having the PDF. The PDF format has been developed by Adobe System Inc. of USA as the format of the electronic documents, and has been actually distributed as the standard format as to the Internet distribution-purpose document formats. Since a print file is converted into a PDF file, a file size thereof may be reduced.

After transmitting the print file (S130), the personal computer PC forms print data for 1 sheet within the content of the print file (S140). The print data for 1 sheet which is firstly formed may correspond to a first page of the content of the print file, conversely, or a final page thereof.

Next, the personal computer PC transmits the formed print data for 1 sheet to the multi-function device 1 (step S150). Subsequently, the personal computer PC judges whether or not data of a next page is present based upon a content of a print file (S160). When the print file requires a plurality of sheets in printing operations, the personal computer PC judges that the data of the next page is still present based upon the content of the print file (YES: S160), and repeatedly performs the process operations defined in the step S140 and the subsequent steps thereof so as to form print data for 1 sheet which is equivalent to the next page (S140). And then, the personal computer PC transmits this formed print data to the multi-function device 1 (S150).

Similarly, the personal computer PC repeatedly performs the process operations defined in the step S140 and the subsequent steps thereof as to form print data every 1 sheet with respect to all of pages contained in the print file which requires the plurality of sheets (S140), and then, transmits all of the formed print data with respect to each of these sheets to the multi-function device 1 (S150). The personal computer PC may transmits the print data to the multi-function device 1 sequentially from the first page of the print file toward the last page thereof, conversely, or sequentially from the last page of the print data toward the first page thereof.

When the personal computer PC forms the print data every 1 sheet with respect to all of these pages of the print file in the above-described manner and then transmits the formed print data to the multi-function device 1, the personal computer PC judges that the data of the next page is not present (NO: S160). And then, the personal computer PC transmits a job end command to the multi-function device 1 (S170) so as to accomplish the data forming process operation.

On the other hand, when the personal computer PC judges that the tag data is not stored in the non-contact type tag 80 by executing the process operation of the step S110 (NO: S110), the personal computer PC forms print data for 1 sheet within the content of the print file in a similar manner to the process operations defined from the step S140 to the step S160 (S180). Next, the personal computer PC transmits this formed print data for 1 sheet to the multi-function device 1 (S185).

Subsequently, the personal computer PC judges whether or not data of a next page is present based upon a content of the print file (S190). When the personal computer PC judges that the data for the next page is still present based upon the content of the print file (YES: S190), the personal computer PC repeatedly performs the process operations defined in the step S180 and the subsequent steps thereof so as to form print data for 1 sheet which is equivalent to the next page (S180). And then, the personal computer PC transmits this formed print data to the multi-function device 1 (S185). When the personal computer PC forms the print data every 1 sheet with respect to all of these pages of the print file and then transmits the formed print data to the multi-function device 1, the personal computer PC judges that the data of the next page is not present (NO: S190), and then, transmits a job end command to the multi-function device 1 (S170) so as to accomplish the data forming process operation.

Figure 6:
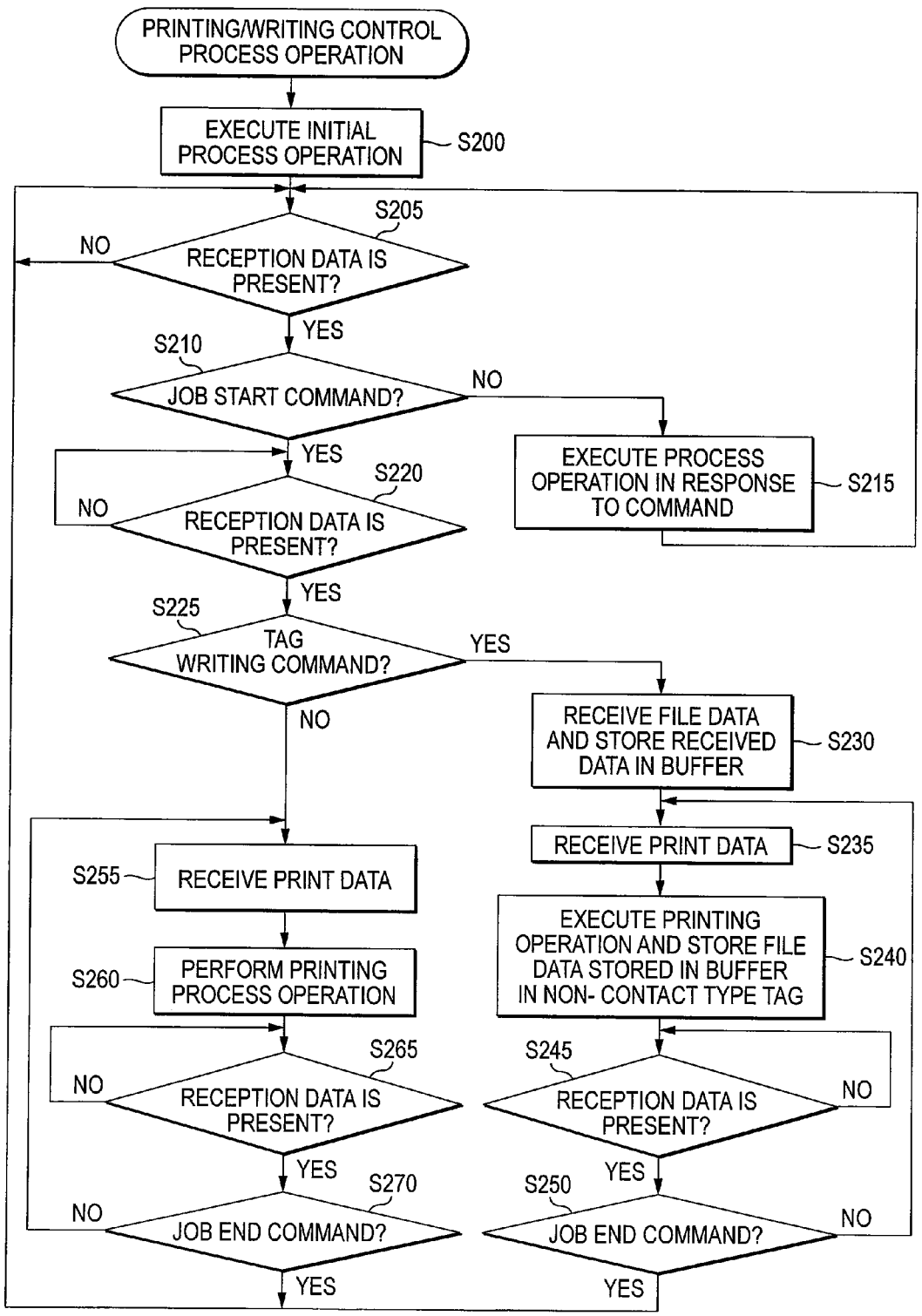
FIG. 6 is a flow chart for showing an example as to a printing/writing control process operation executed in the multi-function device in accordance with an exemplary embodiment of the present invention.

Next, a description is following for explaining a printing/ writing control process operation that is executed by the multi-function device 1. FIG. 6 is a flow chart for explaining one example as to the printing/writing control process operation performed by the multi-function device 1 of the first embodiment.

As shown in FIG. 6, the multi-function device carries out the above-described printing/writing control process, when the power supply of the multi-function device 1 is turned ON. The multi-function device 1 executes an initializing process operation for the hardware in order to establish such a condition that a printing operation can be commenced, for instance, operations and original positions (home positions) of various sorts of sensors are confirmed (S200). The multi-function device 1 judges whether or not reception data transmitted from the personal computer PC is present (S205). When certain data is not transmitted from the personal computer PC (NO: S205), the multi-function device 1 is directly brought into a waiting status. Conversely, when the reception data is present (YES: S205), the multi-function device 1 judges whether or not this reception data is the job starting command (S210). When the personal computer PC executes the process operation of the step S100, the job starting command is transmitted from the personal computer PC to the multi-function device 1.

When the reception data is not the job starting command (NO: S210), the multi-function device 1 executes such a process operation responding to this received command (S215), and repeatedly performs the process operations defined in the step S205 and the subsequent steps thereof. When the received data is the job starting command (YES: S210), the multi-function device 1 judges whether or not reception data is present subsequent to the job starting command (S220).

When certain data is not transmitted from the personal computer PC (NO: S220), the multi-function device 1 is directly brought into a waiting status. Conversely, when the reception data is present (YES: S220), the multi-function device 1 judges whether or not this reception data is the tag writing command (S225). This tag writing command is transmitted from the personal computer PC, when the personal computer PC executes the process operation of the step S120.

When the multi-function device 1 receives the tag writing command (YES: S225), the multi-function device 1 judges that tag data is present which is to be stored in the non-contact type tag 80. And then, the multi-function device 1 receives such a file data that is the print file transmitted from the personal computer PC by executing the process operation of the step S130 subsequent to the tag writing command. And then, the multi-function device 1 stores this received file data in the buffer of the RAM 92 as the tag data (S230). Next, the multi-function device 1 receives print data for 1 sheet "W" which is transmitted from the personal computer PC by executing the process operation of the step S150 subsequent to the file data (S235). And then, the multi-function device 1 executes a printing process operation which prints on the sheet "W" based upon the received print data. And further, the multi-function device 1 executes such a process operation that the multi-function device 1 stores file data stored in the buffer in the non-contact type tag 80 as tag data (S240).

In a storing process operation, when the IC writer 81 is located opposite to the non-contact type tag 80 of the sheet W transported by the discharge roller 69, the IC writer 81 emits electromagnetic waves with an antenna (not shown). And then, the multi-function device 1 stores the file data stored in the buffer in the non-contact type tag 80 of the sheet W as file data. And then, the sheet W is discharged to the sheet discharging tray 2a.

Subsequently, the multi-function device 1 judges whether or not reception data is present (S245). When the reception data is not present (NO: S245), the multi-function device 1 is directly brought into a waiting status, whereas when the reception data is present (YES: S245), the multi-function device 1 judges whether or not the reception data is the job end command (S250).

Since the print file requires a plurality of sheets W for the printing operation, the personal computer PC transmits the print data with respect to each of the plural sheets W sequentially to the multi-function device 1 by executing the process operations defined from the steps S140 to S160. When the print data of the next page is transmitted from the personal computer PC and the multi-function device 1 judges that the reception data is not the job end command (NO: S250), the multi-function device 1 repeatedly performs the process operations defined in the step S235 and the subsequent steps thereof.

Then, the multi-function device 1 receives the print data for 1 sheet of the next page by performing the process operation of the step S235. The multi-function device 1 executes a printing process operation for printing on the sheet W based upon the received print data. And also, the multi-function device 1 executes such a process operation that the multi-function device 1 stores the file data stored in the buffer in the non-contact type tag 80 as tag data (S240).

Subsequently, the multi-function device 1 judges whether or not reception data is present (S245). When the reception data is present (YES: S245), the multi-function device 1 judges whether or not the reception data corresponds to the job end command (S250). When the multi-function device 1 judges that the reception data is not the job end command (NO: S250), the multi-function device 1 repeatedly performs the process operations defined in the step S235 and the subsequent steps thereof.

By executing repeatedly the process operations defined from the steps S235 to S250, the multi-function device 1 prints on the sheet W based upon the print data transmitted from the personal computer PC, and stores the file data constructed of the print files in all of the non-contact type tags 80 of the sheets W as the tag data. In the exemplary embodiment of the present invention, the print file for all of these pages, which is the source file, is directly handled as the file data, and the file data is defined as the tag data. The multi-function device 1 stores such tag data containing the contents of all of the pages in the respective non-contact type tags 80 of the sheets. However, the present invention is not limited only to the above-described storing process operation, but may be applied to other storing process operations. It is sufficient that at least the contents of all of the pages of the print file have been stored in the respective non-contact type tags 80. Alternatively, the multi-function device 1 may also store such a data related to the content for 1 page printed on this page in each of the non-contact type tags 80 as the tag data, simultaneously with storing the print file for all pages.

Also, the present invention is not limited only to such a print file which corresponds to the source file handled as the file data, but may be applied to other print files. For instance, the print file may be converted into a file having another format, e.g., the file having the above-described PDF format may be employed as the file data. The multi-function device 1 may store the file data having PDF format in the non-contact type tag 80 as the tag data.

Since the multi-function device 1 repeatedly performs the process operations defined in the step S235 and the subsequent steps thereof, the multi-function device 1 prints on the sheet W based upon the print data transmitted from the personal computer PC, and stores the file data as the tag data in the non-contact type tag 80 of the sheet W. When the job end command is transmitted from the personal computer PC by executing the process operation of the step S170, the multi-function device 1 judges that this job end command is received (YES: S250). Thus, the process operation as to 1 job is accomplished. And then, the multi-function device 1 repeatedly executes the process operations defined in the step S205 and the subsequent steps thereof.

On the other hand, when the multi-function device 1 judges that the received data is not the tag writing command by executing the process operation of the step S225 (NO: S225), the multi-function device 1 receives print data for 1 sheet W (S255). After receiving the print data, the multi-function device 1 executes a printing process operation for printing on the sheet W based upon the received print data (S260).

After carrying out the printing process operation (S260), the multi-function device 1 judges whether or not reception data is present (S265). When the reception data is not present (NO: S265), the multi-function device 1 is brought into a waiting status, whereas when the reception data is present (YES: S265), the multi-function device 1 judges whether or not the reception data is the job end command (S270)

When the personal computer PC executes the process operations defined from the steps S180 to S190, print data every 1 sheet W are sequentially transmitted from the personal computer PC to the multi-function device 1. When the print data for the next page is transmitted from the personal computer PC to the multi-function device 1 and the multi-function device 1 judges that the reception data is not the job end command (NO: S270), the multi-function device 1 receives the print data for 1 sheet W (S265). After receiving the print data, the multi-function device 1 executes a printing process operation for printing on the sheet W based upon the received print data (S260).

The multi-function device 1 repeatedly performs the process operations defined in the step S255 and the subsequent steps thereof so as to print on the sheet W based upon the print data transmitted from the personal computer PC. When the job end command is transmitted from the personal computer PC to the multi-function device 1 by executing the process operation of the step S170, the multi-function device 1 judges that this job end command is received (YES: S270). And then, since the process operation as to one job is accomplished, the multi-function device 1 repeatedly executes the process operations defined in the step S205 and the subsequent steps thereof.

Thus, when the multi-function device 1 stores the print file as the file data in the non-contact type tag 80 (YES: S225), the multi-function device 1 stores such print file containing the contents of all of these pages in the non-contact type tags 80 of all of the sheets W respectively (S235 to S250).

When a portion of the plural printed sheets W is lost, the non-contact type tag 80, which is provided in the lost sheet W, is also lost. When the multi-function device 1 prints the content printed on the lost sheet W on another sheet W so as to reproduce the lost sheet, the multi-function device 1 can reproduce the sheet W in which the same content of the lost sheet W is printed on as follows: the multi-function device 1 read tag data from such a non-contact type tag 80 of any one of the sheets W which are not lost by operating an IC reader (not shown); and the multi-function device 1 prints on the sheet based upon the read tag data, then the sheet W on which the same content of the lost sheet has been printed is reproduced. Also, even when a portion of 1 sheet W, which contains the non-contact type tag 80, is broken, the sheet W on which the same content of the lost sheet has been printed may be similarly reproduced.

Moreover, even when the multi-function device 1 and the personal computer PC are not installed under such an environment connected to the network, the contents of the print file for all of these pages can be acquired from the non-contact type tags 80 provided in the remaining sheets W.

Although the all sheets W have the respective non-contact type tags 80 in which the print file is stored, the present invention is not limited thereto, but may be modified. For example, even when a portion of a plurality sheets W is broken, or lost, at least a plurality of sheets have the respective non-contact type tags 80 in which the print file is stored, the sheet W on which the same content of the lost sheet has been printed may be reproduced.

Alternatively, when the multi-function device 1 executes a printing process operation, the multi-function device 1 may print such a message that "the print file for all of the pages has been stored in the respective non-contact type tags 80 as the tag data" on the sheets W. When the multi-function device 1 stores the print file in only a plurality of sheets W (not all sheets), the multi-function device 1 may print such a message that "the print file has been stored in the respective non-contact type tags 80 W as the tag data" on these sheets W.

In the above-explained embodiment, the image forming apparatus of the present invention includes the personal computer PC and the multi-function device 1. The personal computer PC transmits both the print data every 1 sheet and the file data as the print file to the multi-function device 1. In the above embodiment, the personal computer PC has been connected via the network to the multi-function device 1. Alternatively, the personal computer PC may be connected via either a printer port or a serial port to the multi-function device 1. Also, the personal computer PC and the multi-function device 1 may be alternatively arranged in an integral body. In this alternative case, the multi-function device 1 may include a card reader that is inserted into a memory card and the like in which a print file has been stored so as to read the stored print file. The image forming apparatus need not be necessarily connected to a network. Alternatively, it is required to read only an edited print file. Further, the image forming apparatus need not a sentence editing.

The present invention is not limited only to the above-described embodiments, but may be accomplished in various modes without departing from the gist of the present invention.

The image forming apparatus of the above-described embodiments can achieve the following advantages.

When a portion of the plural printed sheets W is lost, the image forming apparatus can reproduce the sheet in which the same content of the lost sheet W is printed on as follows: the image forming apparatus read tag data from such a non-contact type tag of any one of the sheets which are not lost; and the image forming apparatus prints on the sheet based upon the read tag data, then the sheet on which the same content of the lost sheet has been printed is reproduced. In addition, even when the image forming apparatus is not installed under such an environment that this image forming apparatus is not connected to the network, the image forming apparatus can easily reproduce the lost sheet by reading the tag data from the non-contact type tag.

Also, the image forming apparatus may store the tag data in the respective non-contact type tags of all sheets to be printed. When at least one sheet is present, the image forming apparatus can reproduce all of the other sheets. Moreover, since the conversion file produced by converting the print file is employed as the file data, the size of the tag data which is stored in the non-contact type tag can be reduced, so that this tag data can be stored even in a small storage capacity of a non-contact type tag.

What is claimed is:

1. An image forming apparatus comprising:
an interface unit which receive print data and file data;
a printing unit which forms an image on a recording medium;
a writing unit which stores tag data in a non-contact type tag when the recording medium provides the non-contact type tag;
a buffer unit in which file data is stored; and
a control unit which controls the printing unit and the writing unit wherein the control unit:
stores the file data in the buffer unit when the file data is received and the printing unit is to form an image on the recording medium having the non-contact type tag, and
after the file data has been stored in the buffer unit,
controls the printing unit to form an image on the recording medium having the non-contact type tag based upon content of the print data when the print data is received, and
controls the writing unit to store the file data stored in the buffer unit in the non-contact type tag after the print data has been received.

2. The image forming apparatus according to claim 1, wherein the control unit stores the file data in the non-contact type tags of all recording media to be printed respectively.

3. The image forming apparatus according to claim 1, wherein the file data is a print file.

4. The image forming apparatus according to claim 1, wherein the file data is print data for all pages of a multi-page job, the file data is converted from the print file.

5. A method for forming an image on a recording medium that has a non-contact type tag, comprising:
a first step in which storing file data in a buffer unit when an image forming apparatus receives the file data and the image forming apparatus is to form an image on the recording medium having the non-contact type tag;
after the file data has been stored in the buffer unit,
a second step in which forming an image by the image forming apparatus on the recording medium having the non-contact type tag based upon print data when the print data is received; and
storing the file data stored in the buffer unit in the non-contact type tags of all recording media being printed respectively after the print data has been received.

6. An image forming apparatus comprising:
an interface unit configured receive print data and file data;
a printing unit configured to form an image on a recording medium;
a writing unit configured to store tag data in a non-contact type tag when the recording medium provides the non-contact type tag;
memory configured to store the file data; and
a control unit configured to:
determine that tag data is to be stored in the non-contact type tag of the recording medium;
cause file data, which is the tag data, received by the interface unit to be stored in the memory;
after the file data has been stored in the memory, cause the printing unit to form an image on the recording medium having the non-contact type tag when the print data is received; and
storing the file data stored in the memory in the non-contact type tag after the print data has been received.

7. The image forming apparatus of claim 6, wherein the file data includes a print file having the print data for each recording medium of a multi-page job.

8. A method for forming an image on a recording medium that has a non-contact type tag, comprising:
determining that tag data is to be stored in the non-contact type tag of the recording medium;
receiving file data from an external source;
storing the file data in memory, wherein the file data is the tag data to be stored;
receiving print data from the external source after having received the file data;
forming an image on the recording medium having the non-contact type tag based upon the print data; and
storing the file data stored in the memory in the non-contact type tag after the print data has been received.

9. The method of claim 8, wherein the file data includes a print file having the print data for each recording medium of a multi-page job.

* * * * *